United States Patent [19]

Parfree et al.

[11] 4,437,729
[45] Mar. 20, 1984

[54] OPTICAL FIBRE CABLES

[75] Inventors: Colin S. Parfree; Peter Worthington, both of Southampton, England

[73] Assignee: International Standard Electric Corporation, New York, N.Y.

[21] Appl. No.: 274,692

[22] Filed: Jun. 17, 1981

[30] Foreign Application Priority Data

Jun. 26, 1980 [GB] United Kingdom ................. 8021035

[51] Int. Cl.³ ............................................. G02B 5/16
[52] U.S. Cl. ............................... 350/96.23; 350/96.10
[58] Field of Search ............... 350/96.23, 96.24, 96.10

[56] References Cited

U.S. PATENT DOCUMENTS

| 4,076,382 | 2/1978 | Oestreich | 350/96.23 |
| 4,169,657 | 10/1979 | Bedard | 350/96.23 |
| 4,239,336 | 12/1980 | Parfree et al. | 350/96.23 |
| 4,375,313 | 3/1983 | Anderson et al. | 350/96.23 |

Primary Examiner—David K. Moore
Assistant Examiner—Robert E. Wise
Attorney, Agent, or Firm—John T. O'Halloran; Mary C. Werner

[57] ABSTRACT

An optical fibre submarine cable is made by extruding a metallic pressure tube by a friction extrusion technique, compressing the tube, applying tensile strength members, applying a conductive tape over the strength members and extruding plastic dielectric material over the tape. Armoring can subsequently be applied for shallow water application.

2 Claims, 8 Drawing Figures

OPTICAL FIBRE CABLES

BACKGROUND OF THE INVENTION

This invention relates to optical fibre cables, particularly to such cables for submarine use.

British Pat. No. 1,550,588 (C. S. Parfree-P. Worthington) discloses an optical fibre cable which includes one or more optical fibres located within a tubular electrical conductor over which there is a cylindrical strain member. Optical fibre cables offer the advantage for submarine telecommunication systems, of propagating the signal over relatively long distances before the signal needs amplification in a repeater. It is estimated that the repeater spacing can be as much as 30 or even 50 km in optical fibre submarine communication systems in the near future.

The repeaters are powered electrically, the power being supplied from a terminal via the tubular metal conductor as disclosed in British Pat. No. 1,550,588.

SUMMARY OF THE INVENTION

The present invention provides a method of making an optical fibre cable which has good flexibility, is resistant to high pressures and to the action of the sea, and is available in long lengths.

According to the present invention there is provided a method of making an optical fibre cable, comprising providing a hollow metallic conductor extruded by a friction extrusion technique, placing one or more optical fibres into the hollow conductor, sizing the conductor to reduce its external diameter to a predetermined value in such a manner so as not to require the conductor to be broken and completing the cable including applying a tensile strength member around the conductor. For a submarine cable completion would also include applying a dielectric layer over the strength member.

Preferably the hollow conductor comprises a C-section tube which is closed and further plastically deformed to reduce its external diameter to the predetermined value.

Preferably the reduction in external diameter of the closed C-section tube is in the range of 5 to 10% of the initially-closed diameter.

Preferably the conductor is made of aluminum or aluminum alloy.

Preferably the sizing of the conductor is effected by drawing it through one or more forming dies. Conveniently the forming dies also effect closure of the gap in the "C" prior to reducing the diameter of the tube. The dies are split-dies enabling cleaning to take place without breaking the extrusion of the optical fibres.

BRIEF DESCRIPTION OF THE DRAWING

The above mentioned and other features and objects of this invention will become more apparent by reference to the following description taken in conjunction with the accompanying drawing, in which.

DETAILED DESCRIPTION OF THE DRAWING

Figure 1:
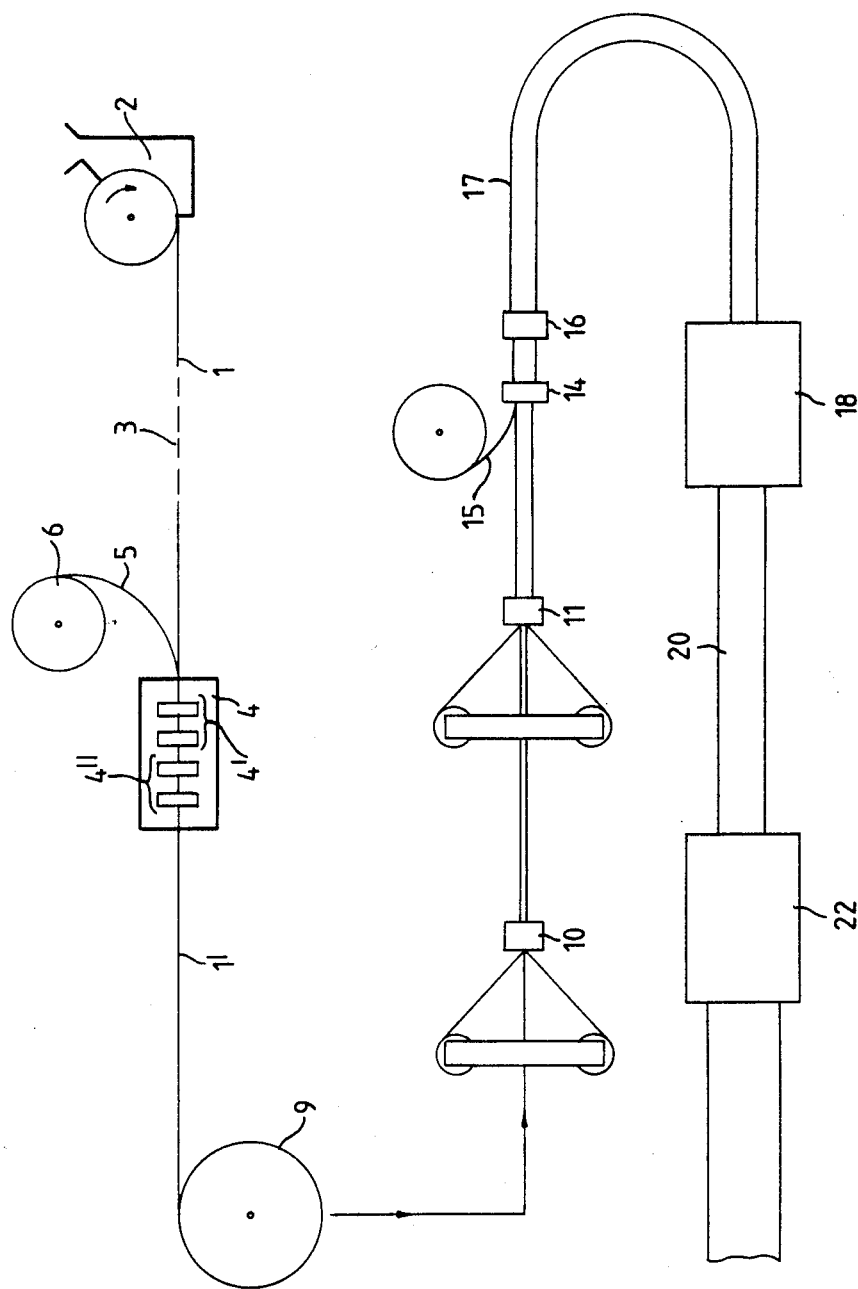
FIG. 1 shows schematically a process for manufacturing an optical fibre cable in accordance with an embodiment of the present invention.
Figure 2:
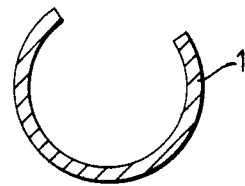
FIG. 2 shows the C-section aluminum tube as formed by the friction-extrusion technique.

Referring to FIG. 1 of the drawing, a hollow metal conductor in the form of a C-shaped section aluminum tube 1 is extruded from a friction extrusion machine 2 to a store 3 indicated by dotted lines. Friction extrusion machines for this purpose are disclosed in British Pat. Nos. 1,370,894 and 1,467,089. It may be possible to eliminate store 3 and feed the extruded tube 1 directly to a series of dies 4, just prior to which an optical fibre preform 5 is fed from a reel 6. The optical fibre preform comprises a plurality of optical fibres 7 held together around a king wire 8, as shown in greater detail in FIG. 3.

The C-sectioned tube is drawn through the dies by a reel 9 and the first set of dies 4' is effective to close the gap between the edges of the "C". Alternatively, the closing may be effected by a rolling mill using profiled wheels. The second set of dies 4" is effective to plastically deform the closed C-section tube to reduce its external diameter to a predetermined value in the range 5 to 10% of the initially-closed diameter.

Figure 3:
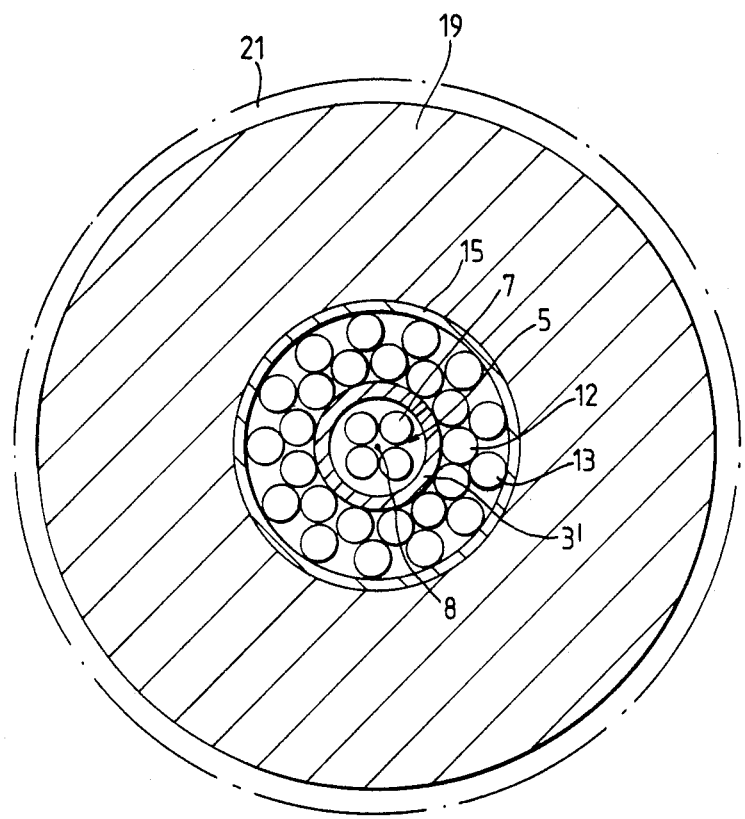
FIG. 3 is a cross-section through one embodiment of a cable formed by the process shown in FIG. 1.

The closed and presized C-section tube 1' containing the optical fibre preform is then fed through a strander or stranders (10 and 11) to apply one or two layers of steel wires 12 and 13 respectively, shown in detail in FIG. 3, to form a tensile strength member.

The predetermined size to whic the closed C-section tube is reduced in the second set of dies, is calculated so that the first layer of tensile strength members 12 exactly touch one another and touch the outer surface of the C-section tube. This is important since, if the tube is too large, the external pressure caused by the layers of strength members and externally applied pressure will cause the first layer of wires to bed into the aluminum tube, thus causing elongation which is undesirable.

At a further station 14 in the manufacturing process, a copper tape 15 is longitudinally applied around the strength members by a set of forming rolls 16.

The emergent cable element 17 is passed into a plastic extruder 18 in which a dielectric layer 19 of polyethylene is extruded around the element 17 to form the finished cable 20.

It may or may not be necessary to apply a sheath 21 in a further extrusion machine 22. Over this sheath 21 may be applied armoring wires if the cable is to be used for submarine telecommunication systems in shallow waters. The armoring is not shown in FIG. 3.

It is important that the aluminum C-section tube is provided in long lengths since welding together shorter lengths causes problems in achieving the desired accuracy in the outer diameter of the closed and deformed C-section tube effected by the dies 4. It has been found that weaknesses can occur at the weld subsequent to its passage through the dies 4. To make it possible to use long lengths of aluminum tubing, it is proposed that split-dies be used for the dies 4, so that these can be removed and cleaned when galling occurs, without the need to break the tubing 3 or the optical fibre preform 5.

A train of four wire sizing dies to convert the hollow C-section aluminum tube containing optical fibres into closed tubing around the fibres is shown in FIGS. 4 to 8. The tube acts both as a conductor for electrical power and as a pressure-resistant tube to withstand high hydrostatic pressures such as are experienced on the ocean floor.

Figure 4:
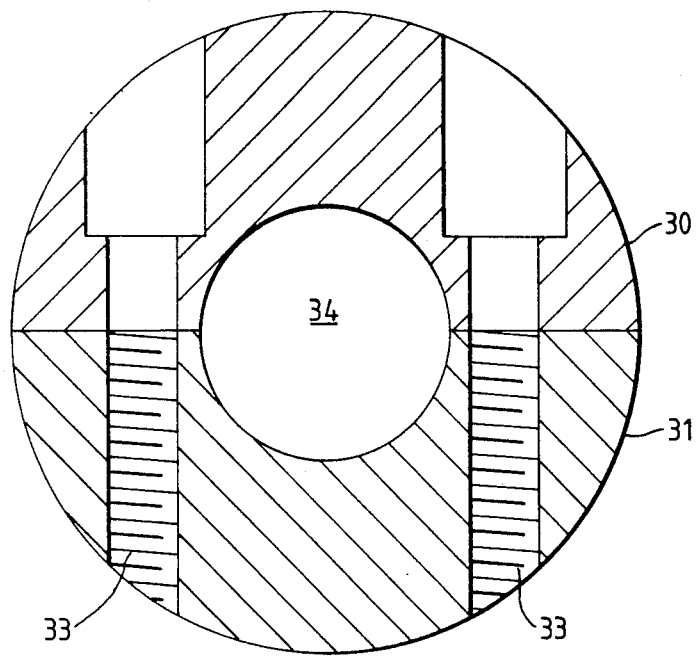
FIG. 4 depicts an end view of a die case.
Figure 5:
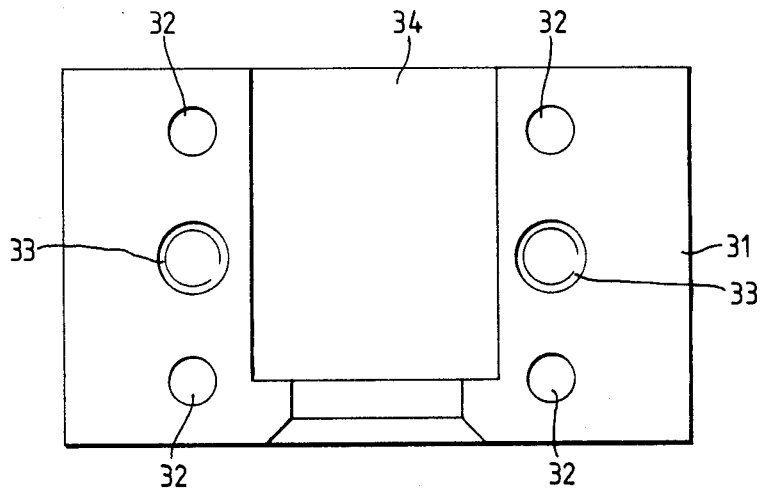
FIG. 5 depicts a sectional view of the die case of FIG. 4.
Figure 6:
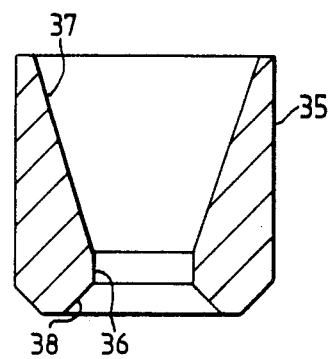
FIG. 6 depicts one half of a die pellet that may be fitted in the die case of FIGS. 4 and 5.
Figure 7:
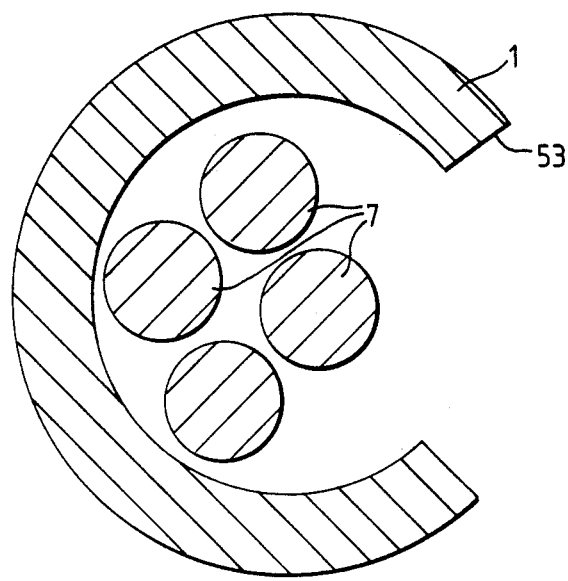
FIGS. 7 and 8 depict cross-sections of part of an optical fibre cable respectively before and after it has been drawn through a train of dies as depicted in FIGS. 4, 5 and 6.
Figure 8:
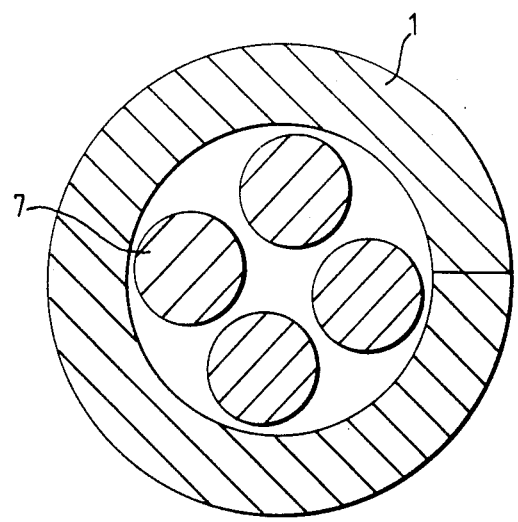

Referring to FIGS. 4 and 5, two semi-cylindrical blocks 30 and 31 are machined from separate cylinders of EN24 steel. Jig-boring is used to provide holes 32 for dowels and holes 33 for pair of screws (not shown) by which one block is secured to the other. The two blocks, which are to form the two halves of the die case, are then assembled, and the main bore 34 houses the two identical die pellet halves 35, one of which is shown in FIG. 6. The die pellet halves are also made from separate pieces of tungsten carbide die pellet stock. Both pieces, which are annular, are cut with a diamond wheel to leave major segments which are just larger than half. These are brazed into their respective die case halves. Since the die pellet inserts are at this stage just larger than halves they protrude a short distance above the machined faces of the die case halves. They are then diamond ground flush with those machined faces. Next, the two halves of the die case are assembled and the existing hole through the die pellet halves is enlarged by spark erosion machining before being given a final polish to size with diamond polish. The bore has a cylindrical throat 36, typically about 2.5 mm long which is preceded by a long taper 37 having a semi-vertical angle of about 10°. Downstream of the throat at 38 the bore is chamfered at about 45°.

A train of four such dies can be used with the throat diameters of 9.0, 8.8, 8.3 and 7.5 mm respectively to close an extrusion of C-section aluminum duct 1 around a set of plastic coated optical fibres 7 which have been introduced in the duct through the opening in its side. The tube 1 which is made of 99.5% commercial grade aluminum, starts with a 9.9 mm overall diameter before closing, a 6.5 mm internal diameter, and an 86° opening between the jaws 53. After closing, the overall diameter is 7.5 mm and the internal diameter in a typical drawing down operation is about 4.3 mm. When operating at a drawing speed of about 6 meters per minute it is found that aluminum pick-up in the dies became noticeable after drawing about 2 km of the tube. The amount of tube that can be drawn before this occurs is, however, variable within a wide range, depending upon die lubrication. Once aluminum pick-up has occurred, it is a matter of only a few minutes to take each die apart, clean it, and re-assemble it ready for continuation of the drawing operation.

We claim:

1. An optical fibre cable comprising in combination an optical fibre,
a closed metallic tubular conductor surrounding said optical fibre, said closed tubular conductor being formed from a pre-sized C-section tube,
a tensile strength member surrounding said closed tubular conductor,
copper tape disposed on the outside of said tensile strength member,
a dielectric layer surrounding said copper tape, and
a sheath disposed on the outside of said dielectric layer.

2. An optical fibre according to claim 1 further including armoring wires disposed on the outside of said sheath.

* * * * *